US006748536B1

United States Patent

Madau

(10) Patent No.: US 6,748,536 B1
(45) Date of Patent: Jun. 8, 2004

(54) KEY SECURITY SYSTEM FOR VEHICLE-BASED INFORMATION NODE

(75) Inventor: Adrian Madau, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/482,456

(22) Filed: Jan. 13, 2000

(51) Int. Cl.[7] .......................... G06F 12/14; G06F 7/00; B60R 21/00

(52) U.S. Cl. ......................... 713/193; 713/185; 701/36; 307/10.3

(58) Field of Search ................................ 380/259, 260, 380/262, 277; 711/163, 164; 713/193

(56) References Cited

U.S. PATENT DOCUMENTS

| | | | | |
|---|---|---|---|---|
| 4,944,008 A | * | 7/1990 | Piosenka et al. | 380/46 |
| 5,396,216 A | | 3/1995 | Morgan | |
| 5,513,107 A | * | 4/1996 | Gormley | 701/48 |
| 5,581,462 A | * | 12/1996 | Rogers | 701/3 |
| 5,677,952 A | * | 10/1997 | Blakley et al. | 713/189 |
| 5,708,307 A | | 1/1998 | Iijima et al. | |
| 5,983,108 A | | 11/1999 | Kennedy, III et al. | |
| 6,198,996 B1 | * | 3/2001 | Berstis | 701/36 |
| 6,272,637 B1 | * | 8/2001 | Little et al. | 713/194 |
| 6,351,813 B1 | * | 2/2002 | Mooney et al. | 713/185 |
| 6,374,653 B1 | * | 4/2002 | Gokcebay et al. | 70/278.3 |
| 6,424,253 B1 | * | 7/2002 | Shen | 340/426.11 |

FOREIGN PATENT DOCUMENTS

| | | |
|---|---|---|
| DE | 196 48 042 A1 | 5/1998 |
| EP | 0 667 597 A2 | 8/1995 |
| EP | 0 841 222 A1 | 5/1998 |
| EP | 0 924 370 A2 | 6/1999 |

* cited by examiner

*Primary Examiner*—Gilberto Barrón
*Assistant Examiner*—Minh Dinh
(74) *Attorney, Agent, or Firm*—John Kajander

(57) ABSTRACT

A system for providing a key-based access to data stored on a vehicle allows the vehicle to be a critical link as a platform for mobile computing while preserving data security. Multiple hierarchies of key codes allow all users to have access to all vehicle functions but different memory partitions for storing data. The partitions may be used for storing user specific data including passwords, preference settings, and driving log data. The data may be encrypted by the key code to be secure even if the memory system is removed from the vehicle or the vehicle is stolen.

16 Claims, 2 Drawing Sheets

FIG. 4
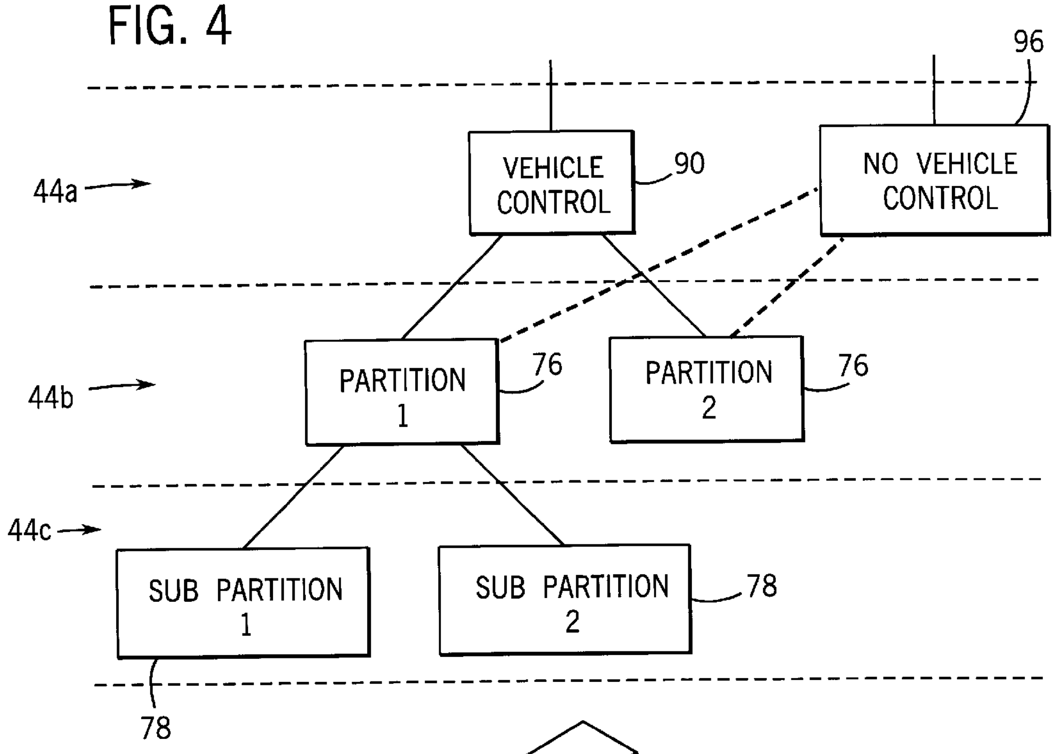
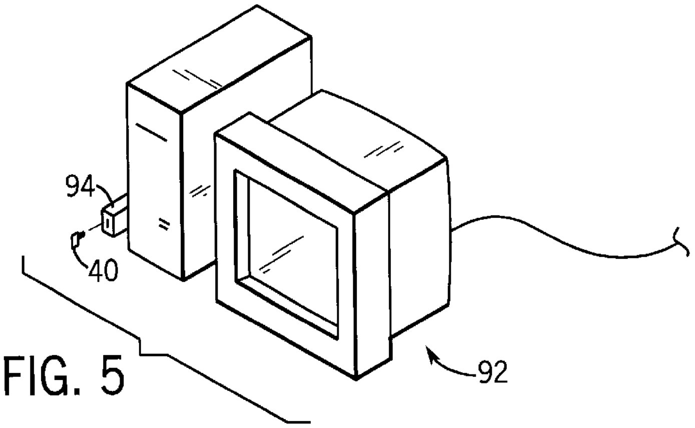
FIG. 5
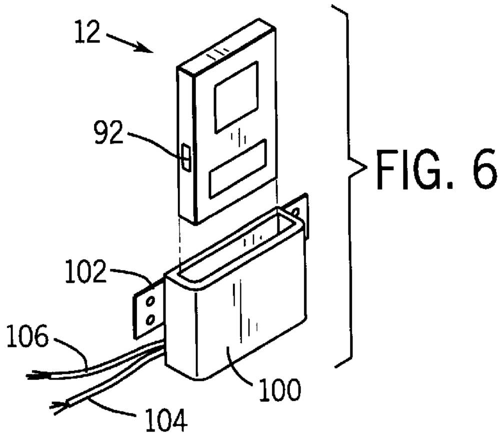
FIG. 6

KEY SECURITY SYSTEM FOR VEHICLE-BASED INFORMATION NODE

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to vehicle security systems and specifically to a key-based security system for providing security for data stored in a vehicle.

In traditional "site-based" computing, critical data is protected by locating the computer in a secure location in a building. With local, physical access to the computer limited, unauthorized remote access to the computer's data, say via the Internet, may be prevented by a 'firewall' program or the like.

Advances in computers and in wireless technologies that allow attaching computers to each other have made "site-independent" or mobile computing practical.

One implementation of a mobile computer combines a personal digital assistant ("PDA") with a cellular telephone to provide a hand-held multipurpose computing device.

Such hand-held computing devices have significant shortcomings. First, the computer hardware, and particularly that devoted to human-machine interface, including the keyboards, display, microphones and speakers, must be substantially reduced in size with an unavoidable reduction in capability. Power constraints caused by limitations in battery technology significantly limit the range and operating time of such mobile devices.

In addition, hand-held mobile devices can be inconvenient to carry and to keep track of. Then too, their portability makes them susceptible to being misplaced or stolen and this makes the data stored in these devices insecure.

BRIEF SUMMARY OF THE INVENTION

The present invention offers an alternative model for mobile computing that avoids many of the problems of hand-held computing devices. The invention makes use of the automobile as an "information node" to store data, provide additional computer hardware, and relay information to other locations. As the natural instrument of our mobility, the automobile provides a platform with ample electrical power and hardware carrying capacity to support the most intensive mobile computing needs.

In this capacity, the automobile may be an "end information node" providing a display terminal and input device, or may be an "intermediary information node" for use as a relay by local hand-held or other computing devices. In this latter capacity, the automobile can conserve the operating power and storage capabilities of the local device.

Critical to this use of the automobile as an information node is a reconciliation of divergent levels of authority over the automobile: the authority to operate the vehicle versus the authority to access vehicle information and its information resources. Unfettered use of the vehicle as a mobile computing resource requires security for the data held within the vehicle. The present invention uses the automotive key, a traditional symbol of authority for operating a vehicle to provide selective access both to vehicle functions and to vehicle data or computing capabilities in the form of application programs.

Specifically, the present invention provides a key-based security system for a vehicle usable with a plurality of coded keys, each having a key value. A key switch receives one of the coded keys to provide a signal indicating a key value for the received key, and an engine control module responds to the key value from the key switch to allow starting of an engine of the vehicle when the key value matches a predetermined car authorization value. A data access filter responds to the key value from the key switch to communicate data with an on-board memory when the key value matches the predetermined data authorization value.

Thus it is one object of the invention to provide security for the data held in a vehicle in its role as an information node. Access to data intuitively follows the same paradigm as access to vehicle functions through the use of a key.

The data access filter may encrypt data communicated to the on-board memory and decrypt data communicated from the on-board memory according to the key value.

Thus it is another object of the invention to recognize the problems of data security inherent in any mobile computing platform and to provide a high degree of data security in the event that possession of the vehicle is lost and/or parts are removed from it in an attempt to gain access to the stored data.

The data access filter may provide a local radio link to a portable terminal or connections to on-board terminals or wireless connection to the Internet or the like, or to a remote computer.

It is therefore another object of the invention to provide a means to leverage the functionality of low-powered, hand-held computing devices with the greater power and hardware capacity offered by the automobile as a mobile computing platform.

The security system may include an off-board subsystem activated by a password. Such a subsystem may be, for example, a residential door lock, a debit terminal, a local or long distance information carrier, or a dedicated residential computer system. The on-board memory may contain the password of the subsystem.

Thus it is another object of the invention to allow seamless communication between the automobile as an information node, and a variety of spatially separated computerized devices as activated and possibly linked by the mobile agent of the automobile. In this latter capacity, the automobile may effectively collect and transport information, normally specific to the driver, between local networks. For example, sensitive banking information downloaded to the car may be uploaded to the home computer when the car returns.

The system may include a second key switch receiving one of the coded keys to provide a signal indicating a key value from the received key, where the second key switch communicates with the engine control module so that the engine control module does not respond to the key value from the second key switch that would allow starting of the engine of the vehicle, but wherein the memory access filter responds to the key value from the second key switch to communicate data with the on-board memory only if the data authorization value matches the key code value.

Thus it is another object of the invention to allow remote access of the vehicle stored data through the key-based system without allowing access to the engine control functions, thereby recognizing different levels of authorization for use of the vehicle. Such a key switch may be associated with a home computer, for example, from which vehicle operation functions should not be accessed.

The key may include a first key code field and a second key code field, each holding a key value. The key switch receiving the coded key may provide a first and second key value of the first and second key code fields of the received key. The engine control module may respond to the first key value to allow starting of the engine of the vehicle when the first key value matches a predetermined car authorization value. The on-board memory may have a plurality of partitions identified, each to different data authorization values and the data access filter may respond to the second key code value to communicate data only with a partition of the on-board memory having a data authorization value matching the second key value.

Thus, it is yet another object of the invention to provide for shared use of the vehicle for different drivers while preserving each driver's exclusive use of the vehicle as an information node. By using keys with identical first key fields and differing second key fields, multiple users of the vehicle may preserve unique data partitions for their data. This allows the use of the vehicle for storage of personal data such as passwords, vehicle preference data and vehicle usage logs.

At least one coded key may also have a third key code field and the partitions on the on-board memory may include sub-partitions identified each to different data authorization values. The data access filter may respond to the third key code value to communicate data only with the sub-partition of the on-board memory having a data authorization value matching the third key value.

Thus it is another object of the invention to provide for a hierarchy of access levels for the memory such as may allow, in effect, a "master key" viewing more than one partition of the on-board memory as may be appropriate in some circumstances.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference must be made to the claims herein for interpreting the scope of the invention.

BRIEF DESCRIPTION OF THE DRAWINGS

FIG. 4 is a graph showing a hierarchy of access authority that may be produced by multiple key code fields in the present invention;

FIG. 5 is a perspective view of a remote computing device with a key switch allowing access to data stored in the vehicle of FIG. 1; and FIG. 6 is a perspective view of a cradle for holding a removable computer system suitable for use with the present invention.

DETAILED DESCRIPTION OF THE INVENTION

Figure 1:
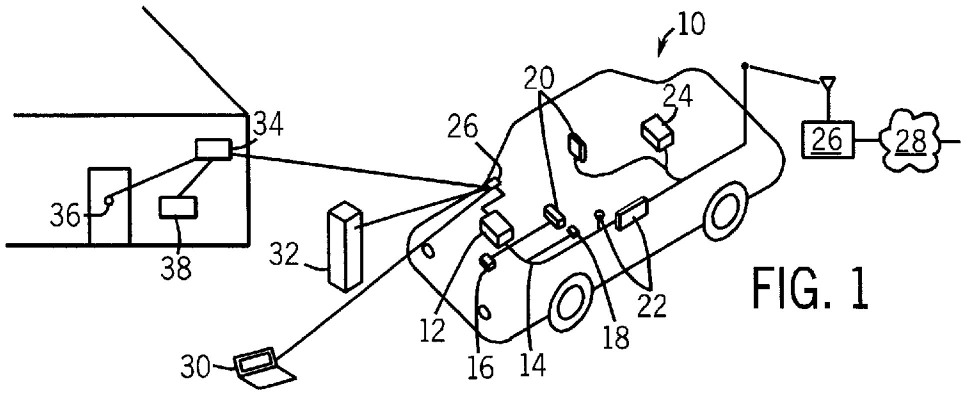
FIG. 1 is a simplified pictorial representation of a vehicle used as a mobile information node providing long distance radio communication with the Internet and local communication with various environmental computers including a portable computing terminal, a kiosk device and a home computer system.

Referring now to FIG. 1, a vehicle 10 may include a mobile computing module 12 providing generally a computer system, as will be described in detail below, communicating via a data bus 14 with other components of the vehicle 10 including an engine control module 16, a key switch 18, one or more interface terminals 20, various automotive peripherals 22 (including for example an electronically adjustable seat and rear view mirror); a high powered transceiver 24 and a low-powered transceiver 26.

The data bus 14 may be any conventional serial digital bus including a CAN link or higher speed computer-type buses such as Universal Serial Bus or Ethernet.

The engine control module 16 provides for real-time control of engine operating parameters, such as is well known in the art, reading a variety of sensors (not shown) measuring engine speed, oxygen and temperature to provide optimal engine performance. In this capacity, the engine control module 16 may disable operation of the automotive engine and other essential automotive features.

The key switch 18 provides a standard mechanical key lock operating an electrical switch as is understood in the art. The key switch 18 also provides an electromagnetic interrogation system allowing additional key codes, in the form of digital words, to be read from the key as stored in digital circuitry in the key, its handle, or a key fob.

The terminals 20 may be conventional computer-type terminals providing a graphics display and/or key pad-type data entry but may also include more sophisticated terminal providing for voice recognition and the like.

The automotive peripherals 22 include standard electrically operated automotive accessories such as provide for the adjustment of the driver and passenger seats (e.g., height, recline, and lumbar support) angle of rear view mirrors, settings of an entertainment center including radio stations and settings for a recorded media player, telephone equipment and navigational equipment including global positioning system receivers.

The high-powered transceiver 24 provides radio satellite or cell telephone-type communication of voice or data via the telephone service or through a connection to the Internet 28 as is understood in the art.

The low-powered transceiver 26 communicates locally over a low-powered radio or light link with nearby hand-held local terminals 30, environmental computers 32 (such as an ATM kiosk) or a residential computer 34. The low-powered transceiver 26 may for example use the Blue Tooth standard providing for local, high-speed, spread-spectrum communication of data. However, other communication channels including infrared link may also be used. The local terminal 30 may be a laptop or palmtop computer including, for example, a personal data assistant (PDA). The environmental computer 32 may be a controller for vehicle access (such as in a parking lot or on a toll road) or for any device requiring electronic intercommunication with the vehicle 10 such as may operate on a drive through or drive by basis. The residential computer 34 may be a stand alone, general purpose, personal computer system or may be a home controller allowing a gateway for control of basic home functions including opening and closing of door locks 36 monitoring or programming of thermostatic setting, lighting and home security systems 38. Thus, the vehicle 10 provides a mobile platform for computing and for accessing a variety of computer-based systems both locally and through the Internet.

Figure 2:
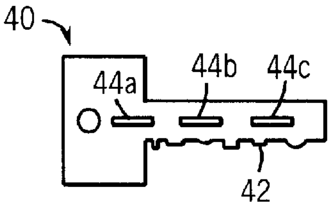
FIG. 2 is a schematic representation of a key used in the present invention providing traditional pin-tumbler mechanism and three key code fields, which may be interrogated electronically.

Referring now to FIG. 2, the vehicle key 40 includes standard wards and notches 42 such as allows rotation of a cylinder in a pin-tumbler-cylinder lock so as to activate a standard electrical switch providing power to the automotive systems as is well understood in the art. As mentioned above, the key 40 also stores an electronically readable data word including three fields 44*a*, 44*b*, and 44*c*, each providing a data word as shown schematically as needed. Such a key 40 may receive power from the key switch 46 from a small battery, electrical contacts communicating with corresponding contacts in 30 the key switch 46, or via an antenna coupling to an electromagnetic field from the key switch 46. An internal integrated circuit, upon receiving power, transmits the data from each of the three fields, 44*a*, 44*b*, and 44*c* to the key switch 46, either through the electrical contracts or a low-powered electromagnetic signal. Other methods of providing the key codes may also be used.

Figure 3:
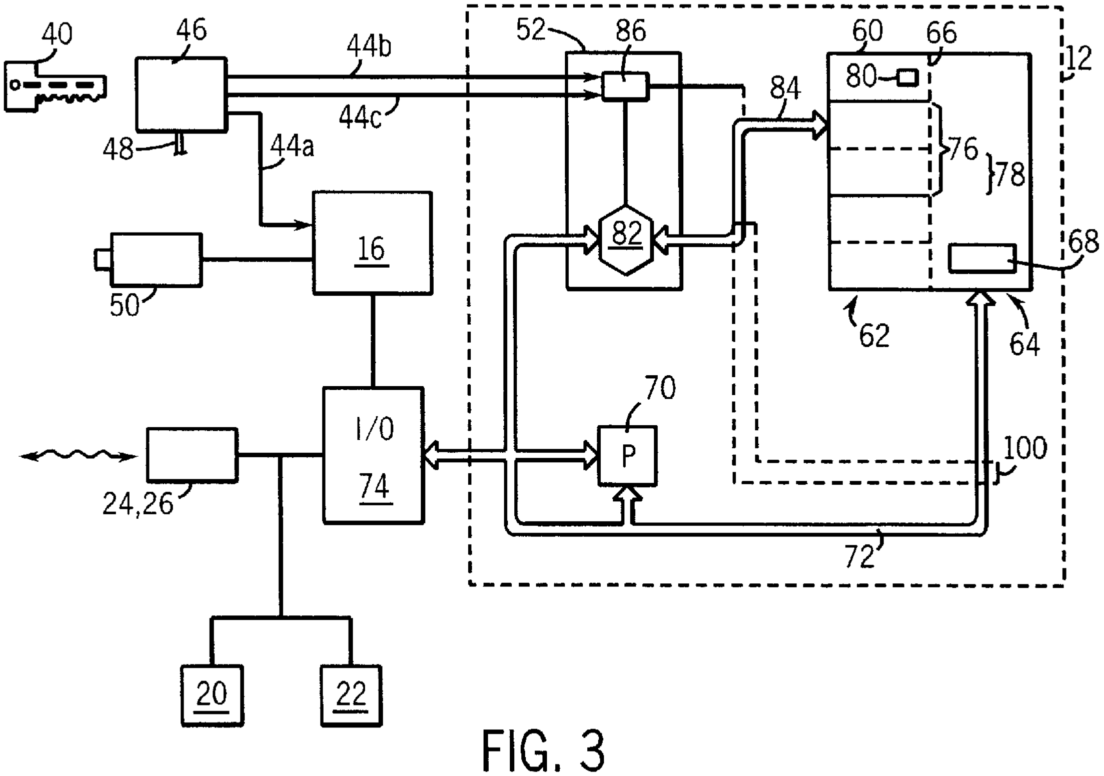
FIG. 3 is a block diagram of the key-based security system of the present invention showing communication of a key switch with an engine control module and with a data access filter providing access to particular partitions of an on-board memory and further showing communication with a variety of peripheral automotive devices.

Referring now to FIG. 3, the key 40, received by a key switch 46 switches electrical power over line 48 to power vehicle systems according to standard methods. The key switch 46 further transmits data from the data fields 44*a* through 44*c* over additional lines to other automotive components. Data word from field 44*a* is provided to the engine control module 16 which reads the data word 44*a* and matches it with an internal vehicle authorization code to allow engine function only if there is a matching between the code of field 44*a* and the internal engine authorization code of the engine control. If such a matching occurs, the engine control module 16 provides the necessary electrical signals to the engine 50 so that it may be started and may run in an ordinary fashion. Momentary operation of the engine may be permitted even without matching of the authorization code.

Data words 44*b* and 44*c* (and possibly 44*a*) are provided to the mobile computing module 12 which includes generally a memory 60, a processor 70 and memory access filter 52.

The memory 60 may include random access memory (RAM) or its equivalent or disk drives or other mass storage devices and is divided generally into two portions 62 and 64 by a firewall 66 of a type well known in the art. The firewall is implemented generally in a software operating system program 68 held in memory 60.

The first portion 64 of the memory 60, depicted to the right of the firewall 66 may be freely accessed by the processor 70 and, through operation of the operating system 68, by other devices communicating with the processor 70 via public bus 72. Thus the first portion 64 of the memory 60 represents a public area of the memory 60.

The second portion 62 of the memory 60 may only be accessed through the memory access filter 52 communicating with the memory via secure bus 84. The operation of the memory access filter 52 will be described in more detail below. The memory access filter selectively communicates data from the second portion 62 over public bus 72 with the processor 70.

Both the processor 70 and the memory access filter 52 use the public bus 72 to also communicate with I/O circuitry 74. Generally, the processor 70, executing programs stored within memory 60, may read or write data from or to the I/O circuitry 74 so as to communicate with other components of the vehicle 10. Direct access of the memory 60 may also be preformed through the public bus 72 either via the memory access filter 52 to the second portion 62 or directly.

Referring still to FIG. 3, the second portion 62 of the memory 60 is partitioned into primary partitions 76 and sub-partitions 78 the latter being parts of primary partitions 76. Each primary partition 76 and sub-partitions 78 is associated with a data authorization value stored in a table 80 linking memory addresses of particular primary partitions 76 and sub-partitions 78 to particular data authorization values. Access to a particular primary partition 76 and sub-partition 78 will be allowed by memory access filter 52 only if the one of the data fields 44*a*–44*c* match the authorization code of that primary partitions 76 or sub-partitions 78. The sub-partitions 78 may store not only data but also application programs that may be desirable to have it accessible to one user and not to others.

Specifically, the data values 44*a*–44*c* are received by a selector 86 in the memory access filter 52, which reads the data values and matches them to entries in table 80 to control the connection of secure bus 84 only to the appropriate partitions. Addresses of the secure bus 84 outside the range of the partition are suppressed. The selector also provides the data values 44*a*–44*c* to an encryption engine 82 which encrypts and decrypts all data passing between it and the memory 60 so that the data in the second portion 62 of memory 60 is encrypted using the key of the appropriate data field 44*a*–44*c*.

In a first embodiment, a single authorization value is used equal to the first data field 44*a*. Thus, access is provided to all primary partitions 76 and sub-partitions 78 when the proper key 40 is inserted into the key switch 46. This creates a single hierarchy of data access, where anyone authorized to drive the car has access to the data of memory 60.

In a second embodiment, the second data field 44*b* and third data field 44*c* are received by a selector 86 with the second data field 44*b* identifying the primary partitions 76 and the third data field identifying the sub-partitions 78 to which authorization may be had. Any or all of the data fields may be used as the encryption/decryption values provided to the encryption engine. In the event that a third data field 44*c* is not provided, access may be granted to the entire partition indicated by second field 44*b*. Thus a master key may be created establishing a hierarchy of control.

Referring now to FIG. 4 at the first level of the hierarchy, data field 44*a* provides access to vehicle control indicated by function block 90. Field 44*b* provides a second level of hierarchy under the vehicle control wherein access to vehicle control is provided and access to particular primary partitions 76, denoted 1 or 2 shown in FIG. 4. Data field 44*c* provides a third level of the hierarchy in which access only to a single sub-partition 78 within primary partition 76 is provided. In this way, a master key may be created having access to multiple sub-partitions while other keys are directed to a single sub-partition. Thus, for example, each driver in a family may be given access to one sub-partition with a regular key. Access to multiple partitions or sub-partitions for service or reprogramming may be provided through the use of a master key omitting data field 44*b* or 44*c*. Alternatively, special values of data field 44*b* or 44*c* may be used indicating unrestricted partition and sub-partition access. In this way a "valet key" may be provided having access to vehicle functions but not to data.

Referring again to FIG. 3, as mentioned above, the secure bus 84 passes through the encryption engine 82 which may optionally encrypt all data passing from the processor 70 or I/O 74 to a sub-partition 78 or decrypt data previously stored in a sub-partition 78 for use by the I/O 74 or processor 70. Thus, it will be understood that the key 40 provides not only access to traditional engine and vehicle features but also provides security for the data that may be stored on the car in its use as a mobile computing platform.

With security provided to the data of the automobile, the automobile's role in mobile computing may be increased.

EXAMPLE 1

Password Encoding

A number of transactions in mobile computing require positive identification of the user. This can be done through the use of a personal identification number (PIN) or password. The password may be stored on the user's terminal as often done in the context of Internet communications through the use of a "cookie". The present invention may provide this functionality in a shared vehicle 10 by storing these password values in a sub-partition 78 only accessible under the implicit authority of the user inserting the key 40 into the key switch 46. Thus transactions with environmental computers such as those which provide access to parking lots, toll road, banking services and the like may make use of password identified transactions for the purpose of conveying identity and standard information in the transaction thus reducing the burden on the user.

Similarly, a residential computer 34 may be automatically activated based on knowledge of the identity of the user of the vehicle contained in the sub-partition 78 in the form of a password or other identifying device. A direct link via low-powered transceiver 26 with the residential computer 34 may be used to automatically open garage doors, light lights and unlock doors under password control. The password may also be used for entering a programming mode for essential house functions remotely from the vehicle 10 or other transactions through the link of high-powered transceiver 24.

EXAMPLE 2

Engine Monitoring

The partitioning system of the present invention, as well as providing security for personal data, may provide an identified location for logging vehicle use of data specific to the user as identified by the data fields of the user's key, although not necessarily of a confidential nature. For example, for fleet use, the engine operation may be monitored and logging of the history of usage may be stored in a sub-partition 78 identified to a particular user through the key 40. A master key may be used to read several sub-partitions 78 for the purposes of reading this logged data. Such data may include miles driven or even location as provided by GPS-type receivers.

EXAMPLE 3

Personality Modules

The data stored in each sub-partition 78 may include settings for the automotive peripherals 22 for example the seat height, and extension and reclining angle, the radio stations desired to be associated with pushbuttons on the radio, radio volume, tone settings, speed dial lists for a standard cell phone associated with the vehicle, mirror and other personality settings for the car. Thus insertion of the key 40 into the key switch 46 may automatically personalize the car to the particular user based on the partitioning in the memory.

EXAMPLE 4

Remote Vehicle Access

As well as providing for a platform for mobile computing, the power and carrying capacity of the vehicle 10 make it valuable as a relay or peripheral for smaller powered local terminals 30. Such local terminals 30 may communicate data through a local link of low-powered transceiver 26 to the vehicle 10 and the higher-powered transceiver 24. Such local terminals 30 may also be site-specific device terminals 92 as shown generally in FIG. 5 allowing, for example, a home based PC computer to make use of the car's subsystems for connection to the Internet or the like. Remote programming and monitoring of the vehicle may be provided by site specific terminals 92 by addition having a second key switch 94 for receiving key 40 to gain access for particular sub-partitions 78 of the memory 60. Such second key switches 94 provide information either through the blocking of key field **44*a* or blocking additional information normally provided by key switch 46, which prevents starting of the engine 50 through the engine control module 16. Referring again to FIG. 4, in this way a new root 96 in the hierarchy is established providing remote access to the memory system of the vehicle only, without access to vehicle functions, may be easily provided on a secure basis. The key switch 94 is preferably similar in design to the key switch 46 but may omit the mechanical aspects of the key switch 46**.

In alternative embodiments, the key switch 94 may be an alternative personal identification system and need not necessarily require the key 40.

Referring now to FIG. 6, although it is likely that the memory 60 of the mobile computing module 12 will be integrally attached to the vehicle, the present invention is equally applicable to systems where the mobile computing module 12 or a portion of it may be removed from the vehicle 10 and the vehicle 10 provides simply a base of power, interface and communication. In such cases, all or a portion of the mobile computing module 12 may be received by cradle 100 attached to the vehicle by a mounting bracket 102 and having connector leads providing for power over lead 104 and data transmission over lead 106 of public bus 72. When the entire mobile computing module 12 is removable, a second key switch 94 in the mobile computing module 12 would provide access to the encrypted and keyed partitions.

The above description has been that of a preferred embodiment of the present invention. It will occur to those that practice the art that many modifications may be made without departing from the spirit and scope of the invention. For example, foreseeable advances in technology may change the form of keys and therefore the term key should be held to include similar devices including "credit card"-type keys and those using transponders and the like. Further, the invention may be extended to include nontransferable personal identification using retinal, fingerprint or voice identification. In order to apprise the public of the various embodiments that may fall within the scope of the invention, the following claims are made.

| NUMBER LIST | |
|---|---|
| 10 | automobile |
| 12 | mobile computing module |
| 13 | computer program |
| 14 | data bus |
| 16 | engine control module |

-continued

| NUMBER LIST | |
|---|---|
| 18 | key switch |
| 20 | terminals |
| 22 | automotive peripherals |
| 24 | transceiver |
| 26 | low-powered transceiver |
| 28 | Internet |
| 30 | local terminal |
| 32 | environmental computer |
| 34 | residential computer |
| 36 | door locks |
| 40 | key |
| 42 | notches |
| 44 | I/O circuitry |
| 46 | key switch (see also #40) |
| 48 | line |
| 50 | engine |
| 52 | memory access filter |
| 60 | memory |
| 62 | second portion |
| 64 | first portion |
| 66 | firewall |
| 68 | operating system |
| 70 | processor |
| 72 | public bus |
| 74 | I/O circuitry (see also #44) |
| 76 | primary partition |
| 78 | sub-partitions |
| 80 | table |
| 82 | encryption engine |
| 84 | secure bus |
| 86 | selector |
| 90 | function block |
| 92 | terminals |
| 94 | key switch (see also #46) |
| 96 | new root |
| 100 | cradle |
| 102 | mounting bracket |
| 104 | lead |
| 106 | lead |

I Claim:

1. A key-based security system for a vehicle usable with a plurality of coded keys each having a key value, the security system comprising:

first and second key switches each capable of receiving one of the coded keys to provide a signal indicating a key value of the received key;

an engine control module responding to the key value from the first key switch but not the second key switch to allow starting of an engine of the vehicle when the key value matches a predetermined car authorization value;

an on-board memory; and a memory access filter responding to the key value from one of the key switches to communicate data with the on-board memory when the key value matches a predetermined data authorization value.

2. The key-based security system of claim 1 wherein the memory access filter, when the key value matches the data authorization value, encrypts data communicated to the on-board memory and decrypts data communicated from the on-board memory according to the key value.

3. The key-based security system of claim 1 wherein the memory access filter provides a local radio link to a portable terminal.

4. The key-based security system of claim 1 wherein the memory access filter provides a connection to at least one on-board terminal.

5. The key-based security system of claim 1 wherein the local memory access filter provides a wireless connection to the Internet.

6. The key-based security system of claim 1 wherein at least one of the key switches includes a pin and tumbler mechanism reading at least a portion of the key code from a mechanical interaction of the key with the associated key switch.

7. The key-based security system of claim 1 wherein at least one of the key switches includes an electromagnetic reader reading at least a portion of the key code from a circuit contained in the key.

8. The key-based security system of claim 1 wherein the second key switch communicates via a wireless link with the vehicle.

9. The key-based security system of claim 1 including further an off-board subsystem activated by a password and wherein the on-board memory contains a password.

10. The key-based security system of claim 9 wherein the off-board subsystem is selected from the group consisting of: a residential door lock, a debit terminal, a long distance phone system, an internet service provider, and a dedicated residential computer.

11. The key-based security system of claim 1 wherein the memory contained an executable file of a computer program.

12. The key-based security system of claim 1 wherein the on-board memory is received within a cradle attached to the vehicle to be removable from the vehicle.

13. A key-based automotive security system for a vehicle usable with a plurality of coded keys having a first key code field and a second key code field each holding a key value, the security system comprising:

a key switch receiving one of the coded keys to provide a first and second key value of the first and second key code fields of the received key;

an engine control module responding to the first key value to allow starting of an engine of the vehicle when the first key value matches a predetermined car authorization value;

an on-board memory having a plurality of partitions identified each to different data authorization values; and a memory access filter responding to the second key code value to communicate data only with a partition of the on-board memory having a data authorization value matching the second key value;

whereby multiple keys all allowing starting of the engine nevertheless provide access to different partitions of the on-board memory;

wherein at least one coded key also has a third key code field, the partitions of the on-board memory include sub-partitions identified each to different data authorization value, and the memory access filter responds to the third key code value to communicate data only with the sub-partition of the on-board memory having a data authorization value matching the third key value.

14. The key-based security system of claim 13 wherein the vehicle provides electronically adjustable occupant devices and wherein the partitions of the on-board memory hold preference setting for these occupant devices.

15. The key-based security system of claim 14 wherein the occupant devices include electronically adjustable seats, electronically adjustable mirrors, and electronically adjustable entertainment terminal settings.

16. The key-based security system of claim 13 wherein the partitions of the on-board data hold data describing a history of operation of the car while the key is in the key switches.

* * * * *